United States Patent
Fu et al.

(10) Patent No.: US 6,243,235 B1
(45) Date of Patent: Jun. 5, 2001

(54) TRANSDUCER SUSPENSION SYSTEM WITH LIMITER

(75) Inventors: Ta-Chang Fu; Darrell Dean Palmer; Tzong-Shii Pan, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,367

(22) Filed: Apr. 16, 1999

(51) Int. Cl.[7] ............................... G11B 5/60; G11B 5/48
(52) U.S. Cl. ..................... 360/245.7; 360/234.5; 360/244.2
(58) Field of Search ............................ 360/234.5, 234.6, 360/234.7, 244.2, 245.6, 245.7, 245.8

(56) References Cited

U.S. PATENT DOCUMENTS

| | | |
|---|---|---|
| 4,724,500 | 2/1988 | Dalziel . |
| 5,333,085 | 7/1994 | Prentice et al. . |
| 5,526,205 | 6/1996 | Aoyagi et al. . |
| 5,771,136 | 6/1998 | Girard . |
| 5,815,349 | 9/1998 | Frater . |
| 5,838,517 | 11/1998 | Frater et al. . |
| 6,067,209 | * 5/2000 | Aoyagi et al. .................. 360/245.7 |
| 6,137,657 | * 10/2000 | Coon et al. ..................... 360/245.7 |
| 6,172,853 | * 1/2001 | Davis et al. ..................... 360/245.7 |

FOREIGN PATENT DOCUMENTS

| | | |
|---|---|---|
| WO 97/43757 | 11/1997 | (GB) . |
| 7-78436 | 3/1995 | (JP) . |
| 7-211033 | 8/1995 | (JP) . |
| 9-45207 | 2/1996 | (JP) . |
| 10-69745 | 3/1998 | (JP) . |
| 10-255423 | 9/1998 | (JP) . |

* cited by examiner

Primary Examiner—Allen T. Cao
(74) Attorney, Agent, or Firm—Douglas R. Millett

(57) ABSTRACT

A transducer suspension system is comprised of a load beam and a flexure. The flexure has a platform for receiving a transducer head. The platform has a forward portion which has a forward facing tab which engages an aperture in the load beam above. The rear portion of the platform has a pair of forward facing rear tabs which engage an aperture in the load beam above. The tabs limit the motion of the flexure during violent shocks, thereby preventing damage to the flexure.

6 Claims, 6 Drawing Sheets

TRANSDUCER SUSPENSION SYSTEM WITH LIMITER

BACKGROUND OF THE INVENTION

1. Field of the Invention

This invention relates generally to a transducer suspension system and more particularly to a suspension system having a flexible mount for the transducer head.

2. Description of Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some proposed disk drives, the slider (or carrier) rides on a liquid film or bearing on the disk. A suspension assembly connects the slider to a rotary or linear actuator. The suspension provides support for the slider.

The suspension must meet several requirements. The suspension must be flexible and provide a bias force in the vertical direction. This is necessary to provide a compensating force to the lifting force of the air bearing in order to keep the slider at the correct height above the disk. Also, vertical flexibility is needed to allow the slider to be loaded and unloaded away from the disk. Another requirement of the suspension is that it must provide a pivotal connection for the slider. Irregularities in operation may result in misalignment of the slider. The slider is able to compensate for these problems by pitching and/or rolling slightly to maintain the proper orientation necessary for the air bearing. Another requirement of the suspension is that it must be rigid in the lateral direction. This is needed to prevent the head from moving from side to side, which will result in the head reading the wrong track.

Disk drives have become smaller in size, and the recording track density has increased dramatically. This has necessitated the use of smaller and smaller heads and suspensions. The smaller size makes it more difficult to string individual wires along the suspension to the head. Recently, electrical leads (or lines) have been integrally formed directly into the suspension by etching or deposition, in order to do away with the need to string separate wires.

As the disk drives have decreased in size, some of the parts have become more delicate. The flexure which provides the mount for the transducer head is one such delicate element. During manufacture or later during operation, a severe shock may cause the transducer head to move violently on the flexure causing the flexure to permanently deform. Also, for slider load/unload applications, it is necessary to limit flexure motion in order to prevent physical damage. Once deformed, the flexure will no longer be able to properly orient the transducer head for normal operations. What is needed is a more robust design for protecting the flexure.

SUMMARY OF THE INVENTION

Briefly, in a preferred embodiment of the present invention, a suspension system comprises a load beam and a laminated member. The laminated member is comprised of at least three layers: an electrically conducting layer, an electrically insulating layer, and a support layer. The laminated leads are formed from the electrically conducting layer.

The support layer is formed into a flexure member. The flexure has a platform for mounting the transducer head. The platform has a single front tab which is bent upward in a direction towards the front of the suspension. The platform also has two rear tabs which are also bent upward in a direction towards the front of the suspension. The front tab engages the front edge of a first aperture in the load beam above. The two rear tabs engage the front edge of a second aperture in the load beam above. The three tabs allow the flexure to move sufficiently in order to perform normal operations. The three tabs effectively limit the movement of the flexure caused by high shock conditions (or load/unload forces) and thereby prevent damage to the flexure.

For a fuller understanding of the nature and advantages of the present invention, reference should be made to the following detailed description taken in conjunction with the accompanying drawings.

DESCRIPTION OF THE PREFERRED EMBODIMENTS

Figure 1:
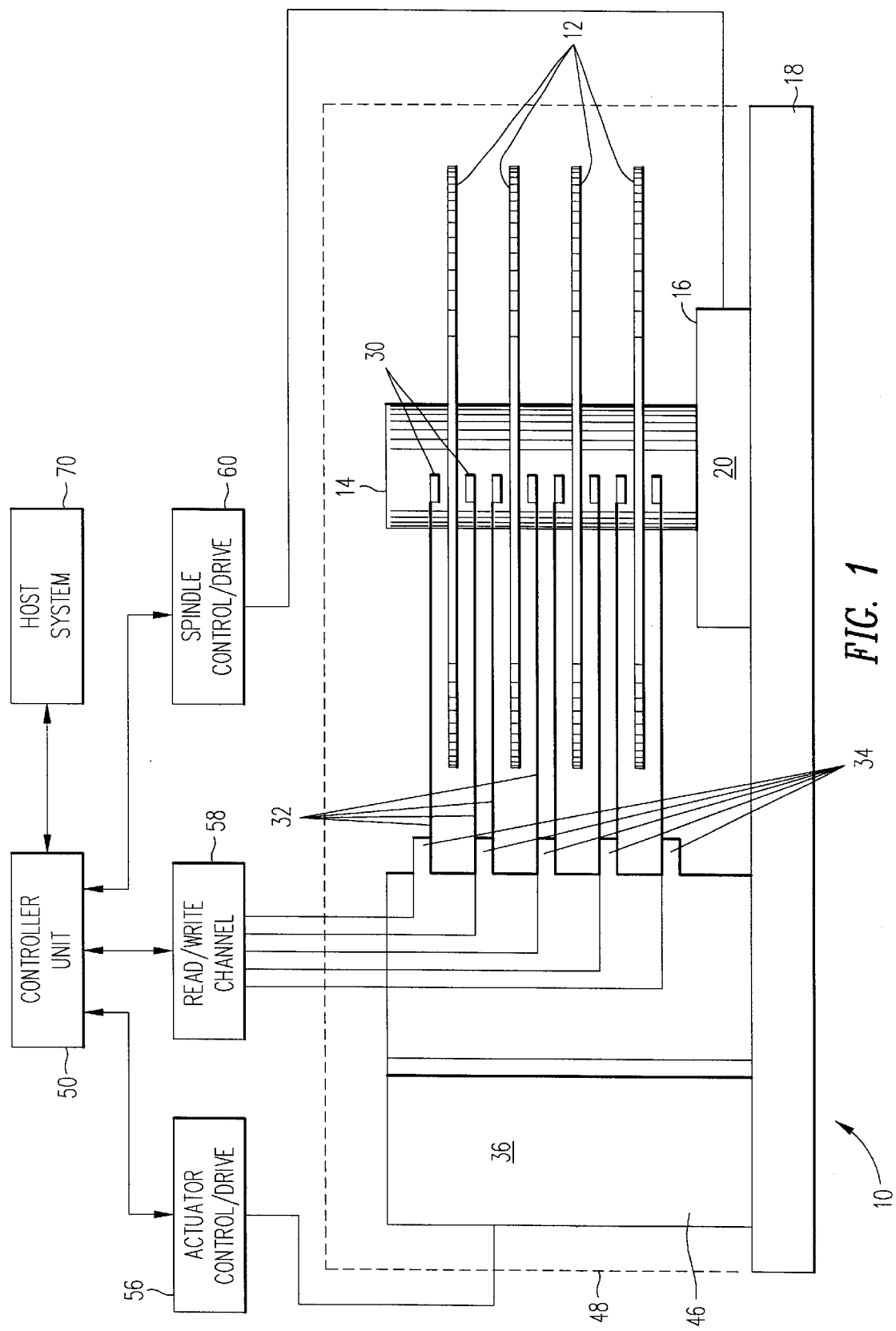
FIG. 1 is a schematic diagram of a data storage system of the present invention.
Figure 2:
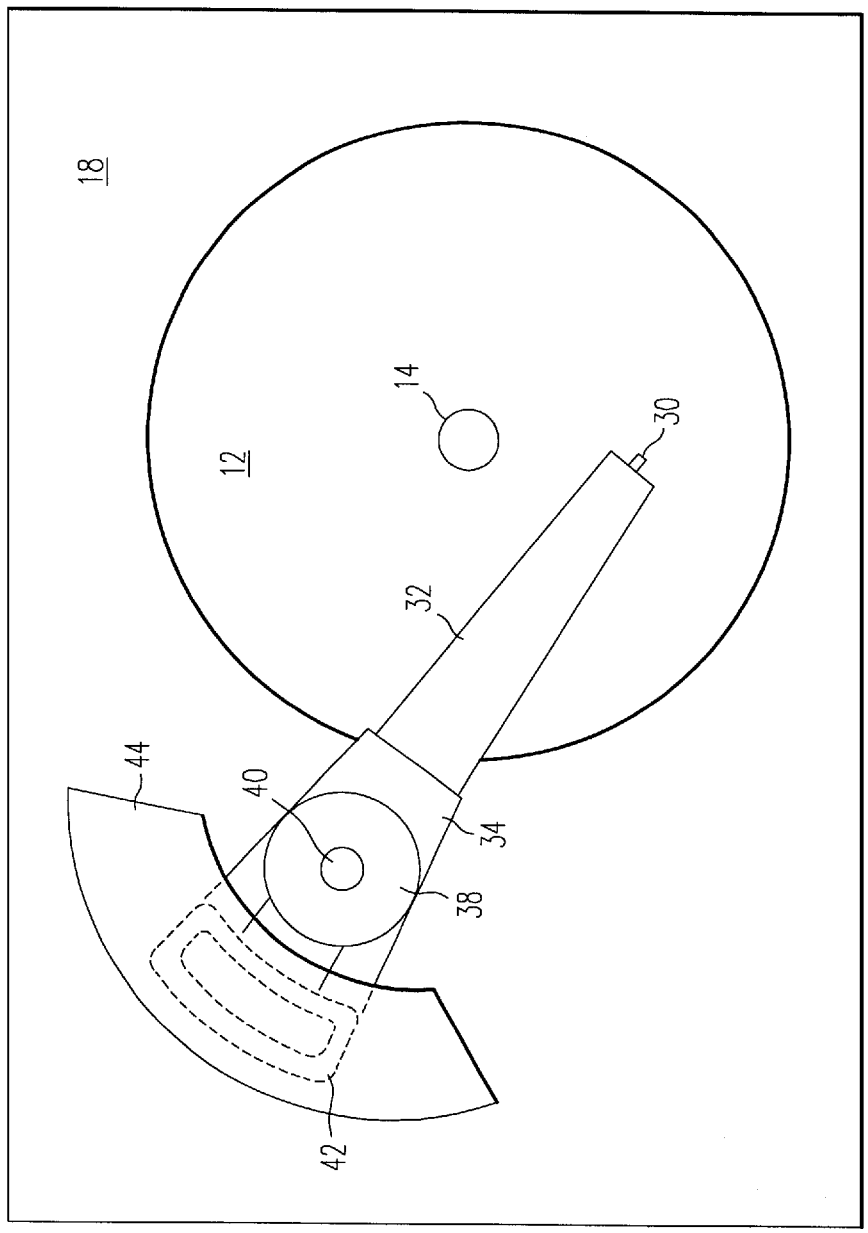
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of transducer assemblies or heads 30 are positioned over the disks 12 such that each surface of the disks 12 has a corresponding head 30. The head 30 is comprised of an air bearing slider and read and write transducer elements. Each head 30 is attached to one of a plurality of suspensions 32 which in turn are attached to a plurality of actuator arms 34. Arms 34 connected to a rotary actuator 36. In a preferred embodiment, the arms 34 are an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspensions 32, arms 34 and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 60 may send digital data to controller 50 to be stored on disks 12, or may request the digital data be read from disks 12 and sent to the system 70. The basic operation of DASD units is well known in the art.

Figure 3:
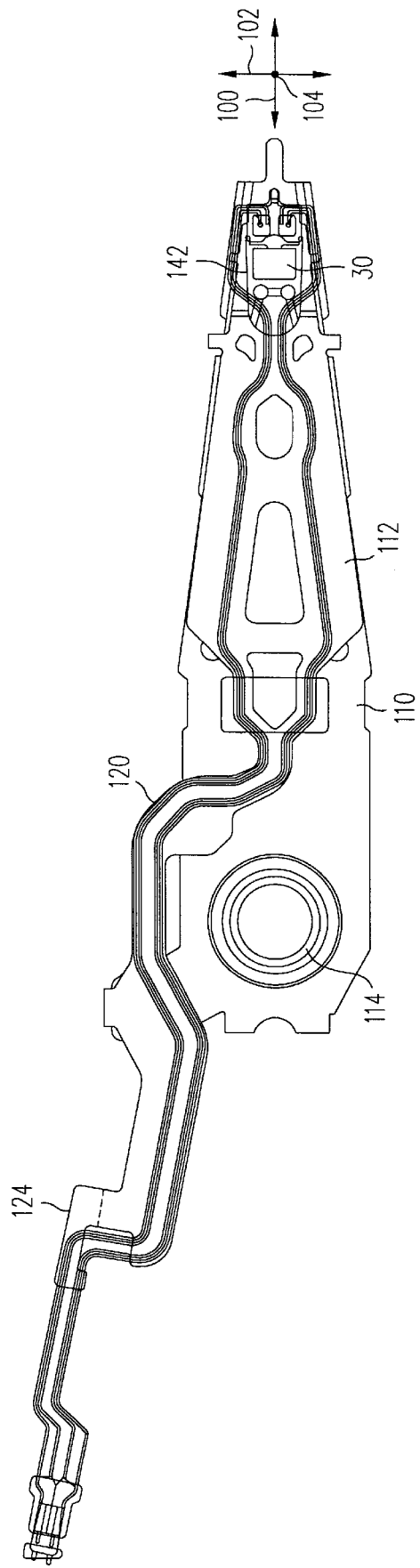
FIG. 3 is a detailed top view of a suspension system of FIG. 1.

FIG. 3 shows a top view of a head 30 and suspension 32. The suspension 32 has a longitudinal axis 100, a lateral axis 102 and a vertical axis 104. Suspension 32 is comprised of a load beam 110 and a laminated member 112. Laminated member 112 is formed from a multi-layer laminated material comprised of a steel support layer and electrically insulating layer, and an electrically conducting layer. The various layers of the laminated member 112 are etched away in a photolithographic process to form the desired shapes. Alternatively, the layers could be built up in a deposition process.

The laminated member 112 is attached to the load beam 110. The load beam 110 is attached to a swage member 114. Welding or adhesive may be used as the means of attachment. The swage member 114 is then swaged or adhesively bonded to arm 34.

The suspension 32 is extremely small. The distance from the end of the actuator arm 34 to the end of the suspension is typically on the order of 15 mm. The head 30 typically measures 1.25 mm×1.00 mm×0.3 mm.

The electrically conducting layers and electrically insulating layers are etched to form electrical lines (or leads) 120 which run from a rear termination pad area located on a connection card l(not shown) to the head 30. The connection card is mounted vertically against the side of the arm 34. The electrical lines 120 are bent vertically at a section 124 to meet with the card. The electrical lines 120 terminate and are electrically attached to the head 30 at head termination pads which are located on the head 30.

The support layer of the laminated member is formed into a flexure member 142 at the end of the suspension 32. Flexure member 142 provides a gimbal mount for attachment of the head 30. The gimbal mount allows the head 30 to pivot in order to adjust its orientation (static attitude) to achieve the proper air bearing between the head 30 and disk 12 while the disk 12 is rotating. The flexure 142, and load beam 110 also serve the purpose of providing support for the electrical lines 120 among other purposes such as providing stiffness, balance and an area for bonding or welding.

Figure 4:
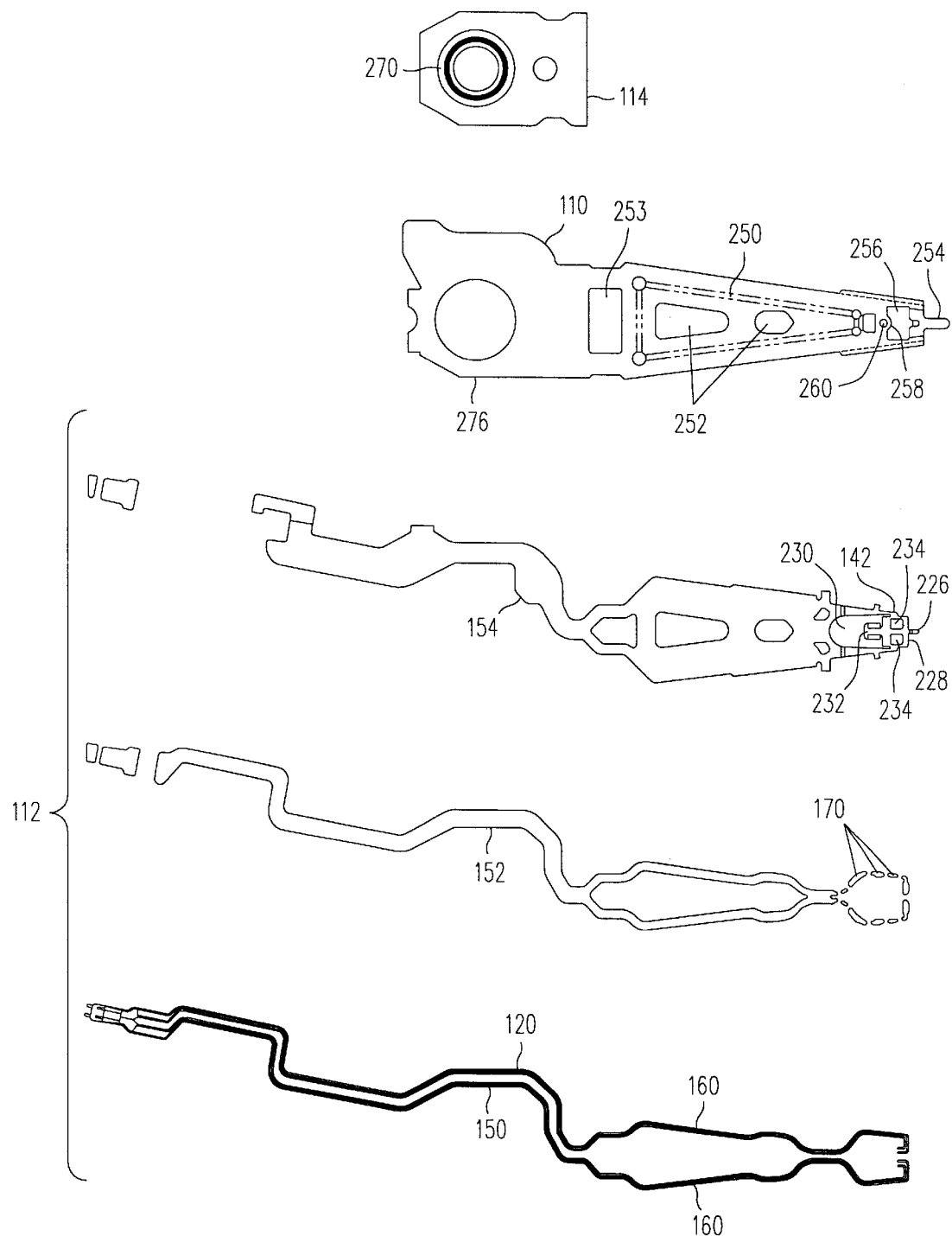
FIG. 4 shows a top plan view of the various elements of the suspension of FIG. 3.
Figure 5:
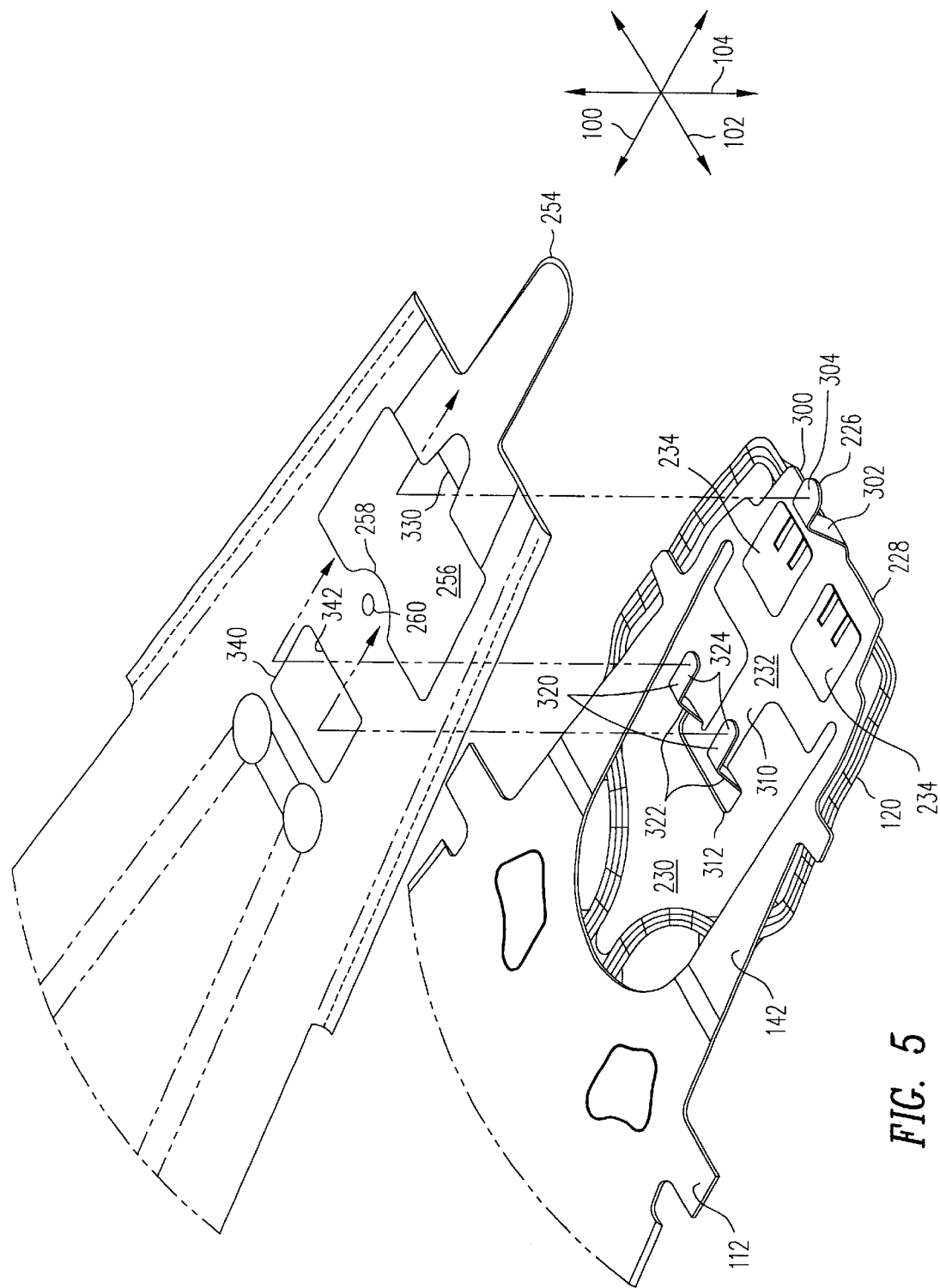
FIG. 5 is a perspective exploded view of the front portion of the suspension.

FIG. 4 shows a plan layout top view of each of the separate elements of the suspension 32 of FIG. 5. The head 30 has been omitted in this figure. Laminated member 112 is comprised of an electrically conducting layer 150, an electrically insulating layer 152 and a support layer 154. Layers 150, 152 and 154 are layers formed from a single laminated sheet of material. In FIG. 4 each of the layers has been separated in order to better view each of their features. However, the three layers 150, 152 and 154 are actually integrally formed together. The member 112 is formed from the integral laminated sheet by using photolithographic etch processes as are known in the art.

Layer 150 is made of an electrically conducting material such as copper or a copper alloy. In a preferred embodiment, the material is C7025 copper alloy and has a thickness of between 0.012 mm and 0.025 mm and preferably 0.018 mm.

Layer 152 is made of an electrically insulating material and in the preferred embodiment is made of polyimide or Teflon. The layer has a thickness of between 0.012 mm and 0.025 mm and preferably 0.018 mm.

Layer 154 is made of a thin stiff material which is able to bend slightly, and in the preferred embodiment is made of 300 series stainless steel. The thickness of this layer is between 0.012 mm and 0.025 mm and preferably 0.020 mm.

The electrical lines 120 of layer 150 are formed into four separate lines 160 of two sets of two lines each. In the drawing of FIG. 4 the four separate lines 160 are not distinguishable, and only the two sets of lines are viewable. The lines 120 start at the connection card located on the arm 34. The connection card provides connection to the read/write channel 58. The connection card is located on the side of the actuator arm 34 when the drive is fully assembled. The lines 120 run in a vertical plane along the side of the arm 34 in a section 124. The lines 120 are then bent upward and run along the top surface of the arm 34. Lines 120 run towards the center longitudinal axis 100 of the suspension 32. Lines 120 then run in a generally longitudinal direction towards the head 30.

At the distal end of suspension 32, the two sets of lines 120 separate and run along either side of head 30, then turn backward to the head 30 to terminate at the front face of head 30 at the head termination pads. This is necessary because the transducer electronics are located on the front face of the slider. This face of the slider is the trailing face as the disk rotates beneath the suspension during operation. Lines 120 are bent 90° vertically in order to interface with the pads on the head 30.

Layer 152 is shaped to provide electrical insulation protection to the lines 120 of layer 150 which directly overlay the layer 152. Layer 152 forms an insulating strip directly beneath the lines 120 of layer 150. At the head area, layer 152 is shaped into a series of pads 170 which underlie lines 120. This is done to allow the lines 120 to be more flexible at the head area in order to minimize the change in static attitude of the head caused by the exertion of force by the lines 120 and to accommodate different temperatures and humidity conditions.

Layer 154 provides support for the lines 120. At its distal end, layer 154 forms the flexure member 142. Flexure 142 has a distal end 226 having a platform 228 which provides support for lines 120. Behind platform 228 is a flexure aperture 230. A tongue section 232 in platform 228 provides support and an attachment point for head 30. Between tongue section 232 and the front of platform 228 are a pair of rectangular apertures 234. Apertures 234 allows the lines 120 to bend as they approach the termination pads of head 30.

Load beam 110 is generally flat and rigid and made of a stainless steel or other rigid material. In a preferred embodiment, the load beam 110 is made of stainless steel and has a thickness of between 0.025 mm and 0.100 mm and preferably 0.051 mm. It is desirable to maintain the weight and the inertia of load beam as small as possible without compromising its structural rigidity.

Load beam 110 has a depressed section 250 which is used to provide additional structural stiffness. Section 250 had a pair of apertures 252 which are used for tool alignment during the manufacturing process. Another aperture 253 forms a spring section of the load beam 110.

Load beam 110 has a distal end with a tab 254 which is used for merge and dynamic loading and unloading of the suspension. An aperture 256 is located behind tab 254. A tongue section 258 extends into aperture 256. A stamped raised button or dimple 260 is located on tongue 258. Dimple 260 contacts tongue section 232 of flexure 142 and allows head 30 (located below tongue section 32) to gimbal (pitch and roll) slightly such that it is able to maintain the proper air bearing orientation. Load beam 110 is also formed by photolithographic process and the raised features are stamped. Laminated member 112 and the load beam 110 are attached by welding. Head 30 is attached to flexure tongue 232 by adhesive.

Swage plate 114 is made of stainless steel and has a thickness of between 0.100 mm and 0.200 mm and preferably 0.178 mm. Swage plate 114 has a swage spud 270 which is a raised cylindrical flange containing a cylindrical aperture.

Arm 34 is made of stainless steel or aluminum and has a thickness of between 0.8 mm and 1.0 mm and preferably 0.9 mm. Arm 34 has a distal end which has an aperture for receiving the spud 270 of swage plate 114.

The construction of the suspension 32 may now be understood. Laminated member 112 is formed from the three layer laminated material. The laminated member 112 is then welded to load beam 110. The load beam 110 is then welded to swage plate 114. The head 30 is then attached to flexure 142 and the leads 120 are bonded to the head pads. The swage spud 270 of swage plate 114 is placed in an aperture of arm 34 and swaged into place.

FIG. 5 shows an exploded perspective view of the load beam 110 and the laminated member 112. The transducer head 30 is not shown, but it would be attached below the laminated member 112 by adhesive bonding to the bottom side of tongue 232. The head 30 is typically bonded to the tongue 232 at a point where tongue 232 forms a cross shape.

Platform 232 may now be shown in more detail. The distal end 226 actually comprises a forward facing tab member 300. Forward tab 300 is formed by two bends (one upward and one forward) in the material of the support layer 154. They form a vertical piece 302 and a horizontal piece 304.

Platform 232 also has a rear extension piece 310 which has a lateral cross piece 312 at its rear portion. The cross piece 312 has a pair of forward facing rear tab members 320. Each of rear tabs 320 is formed by two bends (one upward and one forward) in the material of the support layer 154. Each has a vertical piece 322 and a horizontal piece 324.

The load beam 110 is located above laminated member 112. The aperture 256 of load beam 110 has a forward edge 330. After assembly, the horizontal piece 226 of forward tab 300 passes around edge 330 and engages the top surface of load beam 110.

A second load beam aperture 340 having a forward edge 342 is located above rear tabs 320. Apertures 256 and 340 are located along the longitudinal axis 100 of the suspension. After assembly, the horizontal pieces 324 of rear tabs 320 pass around edge 342 and engage the top surface of load beam 110. Aperture 256 is sized large enough to receive the horizontal piece 304 of tab 300. Aperture 340 is sized large enough to receive the horizontal pieces 324 of both tabs 320.

The lengths of the vertical pieces 302 and 322 of the tabs are large enough to allow the flexure 142 to gimbal normally during operation, yet not so large as to allow flexure 142 to move a distance at which permanent deformation occurs. Typically, the lengths of the vertical pieces 302 is between 0.20 mm and 0.50 mm and preferably 0.38 mm and the lengths of vertical pieces 322 is between 0.10 mm and 0.30 mm and preferably 0.22 mm.

The horizontal pieces 304 and 324 of the tabs are sufficiently long enough such that the tabs remain engaged to the top surface of load beam 110 even during a violent shock. Typically the length of the horizontal piece 304 is between 0.10 mm and 0.30 mm and preferably 0.26 mm and the length of the horizontal pieces 324 are between 0.20 mm and 0.40 mm and preferably 0.32 mm.

Figure 6:
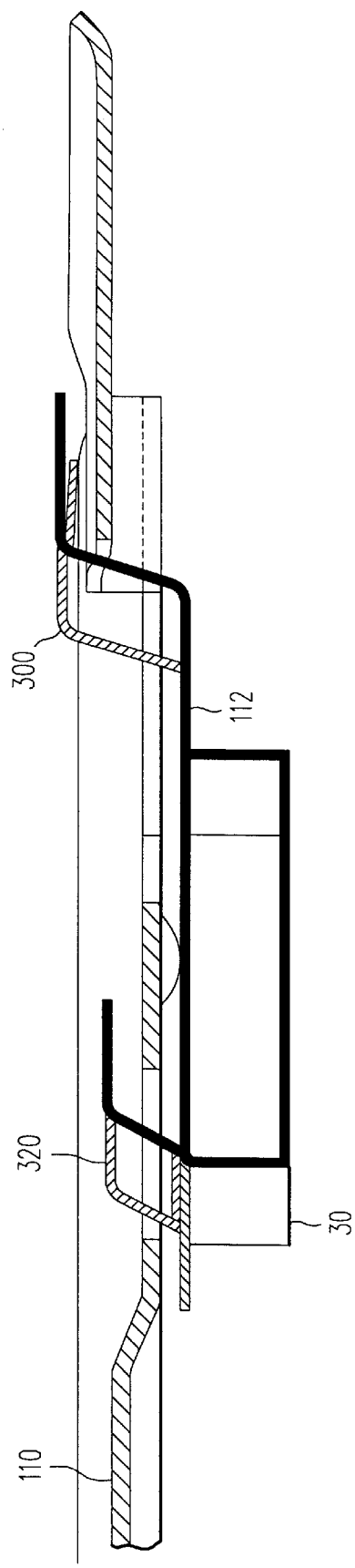
FIG. 6 is a cross-sectional view of the front portion of the suspension.

FIG. 6 shows a cross-sectional view of load beam 110, laminated member 112 and head 30. The tabs 300 and 320 are shown engaging the load beam 110. The figure shows how the tabs 300 and 320 are inserted during manufacture. The initial position is shown in a regular line width. This is the position when tabs 300 and 320 are inserted into their respective apertures. After the tabs are inserted, the head 30 and tabs 300 and 320 are slid forward such that the tabs engage the top surface of the load beam 110. This operating position is shown in a bold line.

The operation of the present invention may now be understood. During a shock the head 30 has a tendency to pitch violently downward and forward. However, because the tabs 300 and 320 are forward facing, the tabs remain engaged. The movement forward merely helps the tabs to engage even more fully. Damage to the flexure 142 is thereby prevented.

While the preferred embodiments of the present invention have been illustrated in detail, it should be apparent that modifications and adaptations to those embodiments may occur to one skilled in the art without departing from the scope of the present invention as set forth in the following claims.

We claim:

1. A transducer suspension system comprising:
   a rigid load beam having a longitudinal, a lateral, and a vertical axes, the load beam having a forward end, the load beam having a first and a second apertures located along the longitudinal axis, each of the first and second apertures having a forward edge;
   a flexure member attached to the load beam, the flexure having a platform for receiving a transducer assembly, the forward portion of the platform having a forward tab member located below the first aperture which engages the forward edge of the first aperture of the load beam, the rear portion of the platform having a pair of rear tab members located below the second aperture which engage the forward edge of the second aperture of the load beam.

2. The system of claim 1, wherein the first tab member is comprised of a vertical portion and a horizontal portion.

3. The system of claim 1, wherein each of the rear tab members are comprised of a vertical portion and a horizontal portion.

4. A transducer suspension system comprising:
   a rigid load beam having a longitudinal, a lateral, and a vertical axes, the load beam having a forward end, the load beam having a first and a second apertures located along the longitudinal axis, each of the first and second apertures having a forward edge;
   a flexure member attached to the load beam, the flexure having a platform for receiving a transducer assembly, the forward portion of the platform having a forward tab member located below the first aperture which engages the forward edge of the first aperture of the load beam, the rear portion of the platform having a pair of rear tab members located below the second aperture which engage the forward edge of the second aperture of the load beam;
   a transducer element attached to the flexure member;
   a recording media located proximate to the transducer element;
   a media movement device for moving the media;
   a transducer movement device for moving the transducer; and
   an electrical device connected to the transducer element for reading data from the media.

5. The system of claim 4, wherein the first tab member is comprised of a vertical portion and a horizontal portion.

6. The system of claim 4, wherein each of the rear tab members are comprised of a vertical portion and a horizontal portion.

* * * * *